(12) United States Patent
Nagafuji et al.

(10) Patent No.: US 8,837,873 B2
(45) Date of Patent: Sep. 16, 2014

(54) OPTO-ELECTRIC HYBRID BOARD AND MANUFACTURING METHOD THEREFOR

(75) Inventors: Akiko Nagafuji, Ibaraki (JP); Yuichi Tsujita, Ibaraki (JP); Masayuki Hodono, Ibaraki (JP); Masami Inoue, Ibaraki (JP); Mitsuru Honjo, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 281 days.

(21) Appl. No.: 13/413,853

(22) Filed: Mar. 7, 2012

(65) Prior Publication Data
US 2012/0251038 A1    Oct. 4, 2012

Related U.S. Application Data

(60) Provisional application No. 61/473,485, filed on Apr. 8, 2011.

(30) Foreign Application Priority Data

Mar. 29, 2011 (JP) .................... 2011-073618

(51) Int. Cl.
*G02B 6/12* (2006.01)
*G02B 6/42* (2006.01)
*G02B 6/26* (2006.01)

(52) U.S. Cl.
CPC ............ *G02B 6/4202* (2013.01); *G02B 6/4231* (2013.01)
USPC ............................................. 385/14; 385/52

(58) Field of Classification Search
CPC ........ G02B 6/42; G02B 6/423; G02B 6/4236; G02B 6/426; G02B 6/4261
See application file for complete search history.

(56) References Cited

U.S. PATENT DOCUMENTS

| | | | | |
|---|---|---|---|---|
| 5,249,245 A | * | 9/1993 | Lebby et al. | 385/89 |
| 5,265,184 A | * | 11/1993 | Lebby et al. | 385/132 |
| 5,625,734 A | * | 4/1997 | Thomas et al. | 385/88 |

(Continued)

FOREIGN PATENT DOCUMENTS

| | | |
|---|---|---|
| JP | 5-196831 A | 8/1993 |
| JP | 2007-148107 A | 6/2007 |

(Continued)

OTHER PUBLICATIONS

Japanese Office Action dated Jun. 24, 2014, issued in corresponding Japanese Patent Application No. 2011-073618 with English translation (6 pages).

*Primary Examiner* — Rhonda Peace
(74) *Attorney, Agent, or Firm* — Westerman, Hattori, Daniels & Adrian, LLP

(57) ABSTRACT

Provided are an opto-electric hybrid board and a manufacturing method therefor. An optical waveguide unit includes protruding portions which are extendingly provided at portions of at least one of an undercladding layer and an overcladding layer, and the protruding portions are located and formed at predetermined locations with respect to a light transmitting surface of a core. An electric circuit unit includes a bent portion having fitting holes into which the protruding portions fit and having an optical element. The fitting holes are located and formed at predetermined locations with respect to the optical element. The optical waveguide unit and the electric circuit unit are coupled to each other in a state in which the protruding portions fit into the fitting holes to form an opto-electric hybrid board.

4 Claims, 15 Drawing Sheets

(56) References Cited

U.S. PATENT DOCUMENTS

| | | | |
|---|---|---|---|
| 5,768,456 A * | 6/1998 | Knapp et al. | 385/49 |
| 6,643,434 B2 * | 11/2003 | Cayrefourcq et al. | 385/52 |
| 7,065,275 B2 * | 6/2006 | Miyamae | 385/49 |
| 7,103,249 B2 * | 9/2006 | Miyamae | 385/49 |
| 7,403,676 B2 * | 7/2008 | Kurihara et al. | 385/14 |
| 7,665,905 B2 | 2/2010 | Tamura et al. | |
| 8,055,105 B2 * | 11/2011 | Hodono | 385/14 |
| 8,333,517 B2 * | 12/2012 | Tanobe et al. | 385/92 |
| 8,391,657 B2 * | 3/2013 | Asahi et al. | 385/52 |
| 8,548,285 B2 | 10/2013 | Hodono | |
| 8,606,056 B2 * | 12/2013 | Tsujita et al. | 385/14 |
| 8,644,655 B2 * | 2/2014 | Tsujita et al. | 385/14 |
| 8,644,660 B2 * | 2/2014 | Nagafuji et al. | 385/31 |
| 8,655,119 B2 * | 2/2014 | Yagisawa | 385/14 |
| 2002/0118924 A1 * | 8/2002 | Murata | 385/52 |
| 2005/0169639 A1 * | 8/2005 | Shen | 398/164 |
| 2008/0037927 A1 * | 2/2008 | Kurihara et al. | 385/14 |
| 2009/0162005 A1 * | 6/2009 | Lu et al. | 385/14 |
| 2012/0237159 A1 * | 9/2012 | Tsujita et al. | 385/14 |
| 2012/0251037 A1 * | 10/2012 | Tsujita et al. | 385/14 |
| 2012/0251038 A1 * | 10/2012 | Nagafuji et al. | 385/14 |
| 2012/0251055 A1 * | 10/2012 | Nagafuji et al. | 385/88 |

FOREIGN PATENT DOCUMENTS

| | | |
|---|---|---|
| JP | 2009-98343 A | 5/2009 |
| JP | 2009-223063 A | 10/2009 |
| JP | 2010-192883 A | 9/2010 |
| JP | 2011-33876 A | 2/2011 |

* cited by examiner

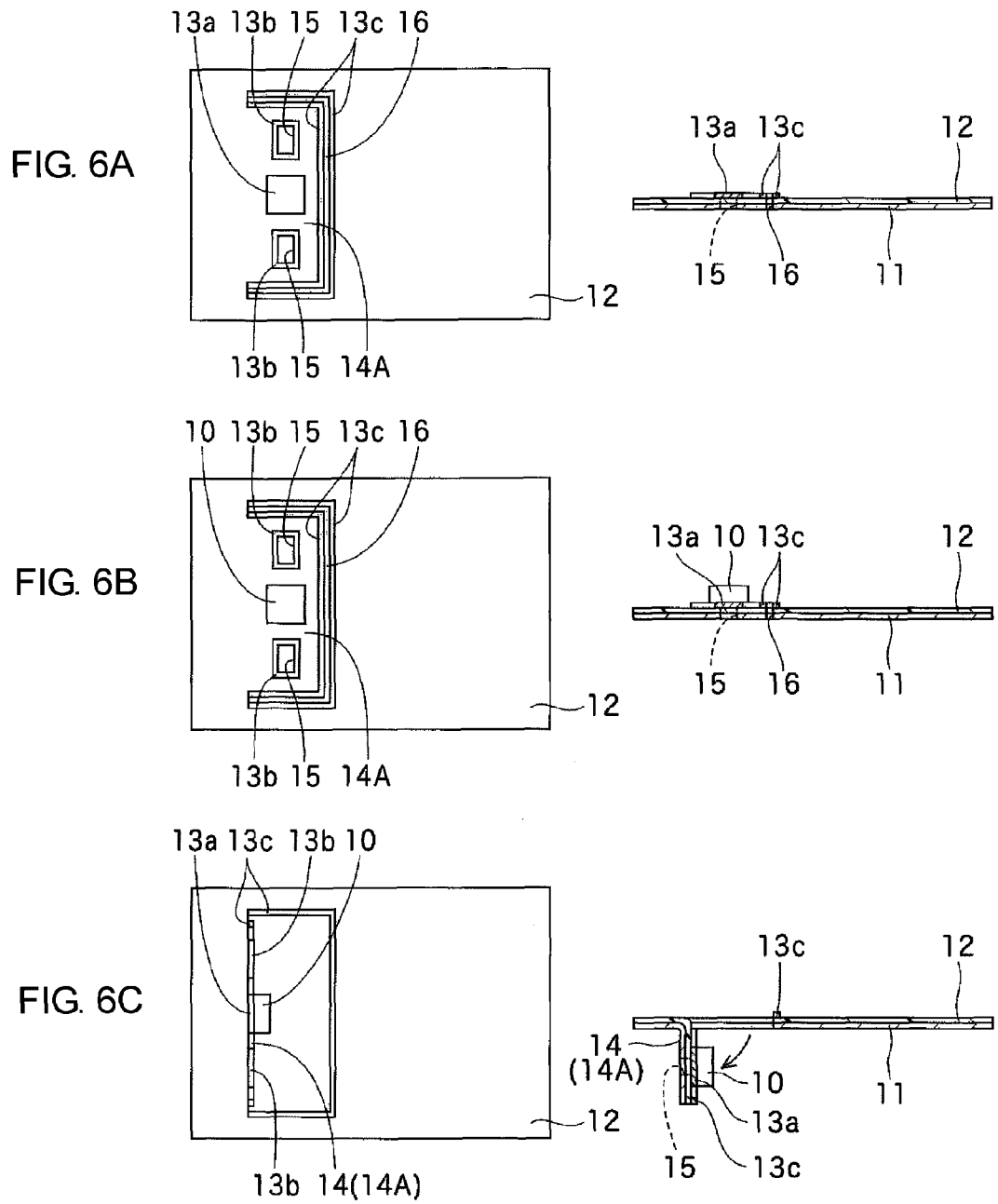

RELATED ART

OPTO-ELECTRIC HYBRID BOARD AND MANUFACTURING METHOD THEREFOR

RELATED APPLICATIONS

This application claims the benefit of U.S. Provisional Application No. 61/473,485 filed on Apr. 8, 2011, which is hereby incorporated by reference.

BACKGROUND OF THE INVENTION

1. Field of the Invention

The present invention relates to an opto-electric hybrid board which includes an optical waveguide unit and an electric circuit unit having an optical element mounted thereon, and a manufacturing method therefor.

2. Description of the Related Art

In recent electronic devices or the like, as the amount of transmission information increases, in addition to electric wiring, optical wiring is adopted. More specifically, an opto-electric hybrid board including an electric circuit unit in which an optical element such as a light-emitting element for converting an electrical signal into an optical signal or a light-receiving element for converting an optical signal into an electrical signal is mounted on an electric circuit board having electric wiring formed thereon, and an optical waveguide unit in which an optical waveguide as optical wiring for transmitting the optical signal is formed is incorporated in the electronic device or the like.

As the above-mentioned opto-electric hybrid board, for example, as illustrated in FIG. 15, there is proposed an opto-electric hybrid board in which an optical waveguide unit W0 is provided on a rear surface side of an optical element mounting surface of an electric circuit unit E0 so as to be parallel to the electric circuit unit E0 (see, for example, JP-A1-2010-192883). In an opto-electric hybrid board of this type, one end surface 52a of a core 52 (optical wiring) of the optical waveguide unit W0 is formed as an inclined surface which is inclined 45°, and the inclined surface of the core is formed into a light reflecting surface. Specifically, the one end surface (inclined surface) 52a of the core 52 reflects light to change an optical path by 90° so that the light may be transmitted between the core 52 and an optical element 10 (see a dot-and-dash line L in the figure). Note that, in FIG. 15, the reference numeral 51 denotes an undercladding layer, the reference numeral 53 denotes an overcladding layer, and the reference numeral 61 denotes a through hole for the optical path.

In the opto-electric hybrid board, light which is emitted from the light-emitting element is required to be reflected by the one end surface 52a (inclined surface) of the core 52 of the optical waveguide unit W0, and light which exits the other end surface (light exit) of the core 52 is required to be received by the light-receiving element. Therefore, it is necessary that the optical element (the light-emitting element or the light-receiving element) 10 and the core 52 be aligned with each other.

Accordingly, methods of aligning the optical element and the core are conventionally proposed. In an exemplary method, an optical waveguide unit is fixed and, in a state in which light is emitted from a light-emitting element to one end surface (light entrance) of a core of the optical waveguide unit while the location of the light-emitting element is changed, the intensity of light which exits from the other end surface (light exit) of the core is monitored, and the location at which the intensity becomes the highest is determined as the alignment location (see JP-A1-HEI5 (1993)-196831). In another exemplary method, a connector having holes for locating formed therein is attached to an optical waveguide unit, pins for locating, which fit into the holes, are attached to an electric circuit unit, and, by fitting the pins into the holes, respectively, an optical element and a core of the optical waveguide unit are automatically aligned (see JP-A1-2009-223063).

However, in the aligning method described in JP-A1-HEI5 (1993)-196831 above, although alignment with high accuracy is possible, it takes time and effort, and thus, the method lacks mass-productivity. Further, in the aligning method described in JP-A1-2009-223063 above, although position adjustment may be carried out in a simple method of fitting the pins into the holes, respectively, not only dimensional deviations are caused when the connector and the pins are respectively manufactured but also misalignment of the attachment location of the connector with respect to the optical waveguide unit, misalignment of the attachment location of the pins for locating with respect to the electric circuit unit, and the like are caused. Accumulation of those dimensional deviations and misalignments lowers the accuracy of the alignment. If enhancement of the accuracy of the alignment is attempted, control of the dimensional accuracy is necessary so that the dimensional deviations and misalignments are not caused, and thus the cost increases and the method lacks mass-productivity.

In addition, as described above, in the opto-electric hybrid board in which the optical waveguide unit is provided on the rear surface side of the optical element mounting surface of the electric circuit unit so as to be in parallel to the electric circuit unit as in JP-A1-2010-192883 above, it is necessary to form the one end surface of the core as an inclined surface (light reflecting surface) which forms an angle of 45° with accuracy to change the optical path by 90° so that light may be transmitted between the core and the optical element. However, this lacks productivity because it is necessary to form the above-mentioned inclined surface.

SUMMARY OF THE INVENTION

An opto-electric hybrid board is provided which eliminates the necessity of an aligning operation of a core of an optical waveguide unit and an optical element of an electric circuit unit, which is excellent in mass-productivity, and which eliminates the necessity of forming an end surface of the core as an inclined surface for reflecting light even if the optical waveguide unit is provided so as to be parallel with the electric circuit unit. A manufacturing method therefor is also provided.

An opto-electric hybrid board is provided, including: an optical waveguide unit; and an electric circuit unit having an optical element mounted thereon, the electric circuit unit and the optical waveguide unit being coupled so as to be parallel to each other, in which the optical waveguide unit includes: an undercladding layer; a core for an optical path, which is formed on a surface of the undercladding layer; an overcladding layer which covers the core; and a protruding portion for locating the electric circuit unit, which is extendingly provided at a portion of at least one of the undercladding layer and the overcladding layer; the electric circuit unit includes: an electric circuit board; the optical element mounted on the electric circuit board; a bent portion formed by bending an optical element mounting portion of the electric circuit board; and a fitting hole which is formed in the bent portion and into which the protruding portion fits; the protruding portion of the optical waveguide unit is located and formed at a predetermined location with respect to a light transmitting surface of the core; the optical element of the electric circuit unit is located and mounted at a predetermined location of the bent portion; the fitting hole formed in the bent portion is located and formed at a predetermined location with respect to the optical element; and the optical waveguide unit and the electric circuit unit are coupled to each other in a state in which the protruding portion of the optical waveguide unit fits into the fitting hole of the electric circuit unit.

Further, there is provided a manufacturing method for an opto-electric hybrid board in which an optical waveguide unit and an electric circuit unit having an optical element mounted thereon are coupled so as to be parallel to each other, the method including: manufacturing the optical waveguide unit including: forming an undercladding layer; forming, on a surface of the undercladding layer, a core for an optical path; and forming an overcladding layer so as to cover the core, at least one of the forming an undercladding layer and the forming an overcladding layer including extendingly providing a protruding portion for locating the electric circuit unit at a predetermined location located with respect to a light transmitting surface of the core; manufacturing the electric circuit unit including: forming an electric circuit board; mounting the optical element at a predetermined portion on the electric circuit board, the forming an electric circuit board including forming a fitting hole into which the protruding portion fits at a predetermined location located with respect to an expected mounting location of the optical element; and after the mounting the optical element, forming, by bending, a predetermined portion which is located with respect to the optical element and which includes the optical element and the fitting hole; and coupling the optical waveguide unit and the electric circuit unit to manufacture the opto-electric hybrid board, the coupling including fitting the protruding portion of the optical waveguide unit into the fitting hole of the electric circuit unit.

In the opto-electric hybrid board, the optical waveguide unit and the electric circuit unit having the optical element mounted thereon are coupled so as to be parallel to each other. Further, in the optical waveguide unit, the light transmitting surface of the core and the protruding portion for locating the electric circuit unit are in a positional relationship of being located with respect to each other. Further, in the electric circuit unit, the bent portion is formed. The optical element is located and mounted at a predetermined location of the bent portion, and a fitting hole into which the protruding portion fits is formed in a predetermined location with respect to the optical element. Therefore, in a state in which the protruding portion of the optical waveguide unit fits into the fitting hole of the electric circuit unit, that is, in a state in which the optical waveguide unit and the electric circuit unit are coupled to each other, the core of the optical waveguide unit and the optical element of the electric circuit unit are automatically aligned. Further, the fitting is carried out with the optical element mounting portion being bent (bent portion), and the optical element and the light transmitting surface of the core are in a state of being opposed to each other. Therefore, even in an opto-electric hybrid board in which the optical waveguide unit is provided so as to be in parallel to the electric circuit unit, it is not necessary to form an end surface of the core as an inclined surface for reflecting light (it is not necessary to form an end surface of the core as a structure for changing the optical path by 90°). In addition, the protruding portion of the optical waveguide unit is provided by extending the predetermined portion of at least one of the undercladding layer and the overcladding layer which form the optical waveguide unit, while the fitting hole of the electric circuit unit is formed in the electric circuit unit. Therefore, an additional component such as a connector is not provided for fitting the protruding portion into the fitting hole. Therefore, in the coupling between the optical waveguide unit and the electric circuit unit, there is no accumulation of dimensional deviations and misalignments due to such additional components including a connector, and the core of the optical waveguide unit and the optical element of the electric circuit unit are aligned with high accuracy. Further, in the opto-electric hybrid board, the core and the optical element are formed to be automatically aligned with high accuracy by a simple operation of bending the optical element mounting portion of the electric circuit unit and fitting the protruding portion of the optical waveguide unit into the fitting hole of the bent portion, and thus an aligning operation which takes time and effort is not necessary and the opto-electric hybrid board is excellent in mass-productivity. Further, an additional component such as a connector is not necessary for fitting the protruding portion into the fitting hole, and thus control of the dimensional accuracy of the connector or the like is not necessary. Also in this regard, the opto-electric hybrid board is excellent in mass-productivity.

In particular, when the optical waveguide unit is fixed to the surface of the electric circuit unit via a base member, the base member enables setting of the optical waveguide unit at an appropriate height level. Further, the base member enables improvement in the strength of the opto-electric hybrid board.

Further, the manufacturing method for an opto-electric hybrid board is carried out by coupling the optical waveguide unit and the electric circuit unit having the optical element mounted thereon so as to be in parallel to each other. In the step of manufacturing the optical waveguide unit, the protruding portion for locating the electric circuit unit is extendingly provided at a predetermined location which is located with respect to the light transmitting surface of the core. Further, in the step of manufacturing the electric circuit unit, the bent portion including the fitting hole into which the protruding portion of the optical waveguide unit fits and the optical element is formed at a predetermined location which is located with respect to the optical element. Therefore, by fitting the protruding portion of the optical waveguide unit into the fitting hole of the electric circuit unit to couple the optical waveguide unit and the electric circuit unit to each other, the core of the optical waveguide unit and the optical element of the electric circuit unit may be automatically aligned with ease. Further, the fitting is carried out with the optical element mounting portion being bent (the bent portion being formed), and with the optical element and the light transmitting surface of the core being opposed to each other. Therefore, even in a manufacturing method for an opto-electric hybrid board in which the optical waveguide unit is provided so as to be parallel to the electric circuit unit, it is not necessary to form an end surface of the core as an inclined surface for reflecting light (it is not necessary to form an end surface of the core as a structure for changing the optical path by 90°). In addition, the protruding portion of the optical waveguide unit is formed by extending the predetermined portion of at least one of the undercladding layer and the overcladding layer which form the optical waveguide unit, while the fitting hole of the electric circuit unit is formed in a part of the electric circuit board which forms the electric circuit unit. Therefore, an additional component such as a connector is not necessary for fitting the protruding portion into the fitting hole. Therefore, according to the manufacturing method for an opto-electric hybrid board, in the coupling between the optical waveguide unit and the electric circuit unit, there is no accumulation of dimensional deviations and misalignments due to such an additional component including a connector, and the core of the optical waveguide unit and the optical element of the electric circuit unit are aligned with high accuracy. Further, as described above, the core and the optical element are automatically aligned, and an additional component such as a connector may be eliminated, and thus the method is excellent in mass-productivity.

In particular, when the optical waveguide unit is fixed to the surface of the electric circuit unit via the base member, the base member enables setting of the optical waveguide unit at an appropriate height level. Further, the base member enables improvement in the strength of the opto-electric hybrid board.

BRIEF DESCRIPTION OF THE DRAWINGS

FIGS. 6A to 6C are explanatory views schematically illustrating manufacturing steps for the electric circuit unit which are continued from FIG. 5.

FIGS. 13A and 13B schematically illustrate the optical waveguide unit in still another form, of which FIG. 13A is a front view thereof and FIG. 13B is a sectional view taken along the line B-B of FIG. 13A.

DETAILED DESCRIPTION OF THE INVENTION

Next, embodiments of the present invention are described in detail with reference to the drawings.

Figure 1:
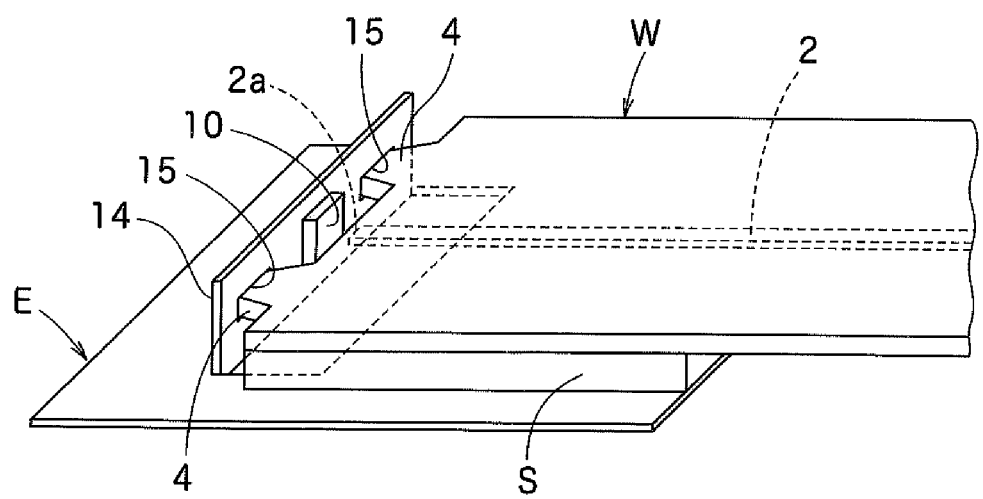
FIG. 1 is a perspective view schematically illustrating a first embodiment of an opto-electric hybrid board.

FIG. 1 is a perspective view schematically illustrating a first embodiment of an opto-electric hybrid board. In the opto-electric hybrid board, an optical waveguide unit W having protruding portions 4 for locating an electric circuit unit, and an electric circuit unit E having fitting holes 15 into which the protruding portions 4 fit, respectively, are separately manufactured, and the optical waveguide unit W and the electric circuit unit E are coupled to be integral by fitting the protruding portions 4 of the optical waveguide unit W into the fitting holes 15 of the electric circuit unit E, respectively. A bent portion 14 is formed in the electric circuit unit E. The fitting holes 15 are formed in the bent portion 14, and an optical element 10 is mounted on the bent portion 14. The optical waveguide unit W is placed on a surface of the electric circuit unit E via a base member S so as to be in parallel to the electric circuit unit E. Note that, the optical waveguide unit W and the electric circuit unit E may be fixed via the base member S using an adhesive, an adhesive tape, or the like as necessary.

Here, in the optical waveguide unit W, the protruding portions 4 are located and formed at predetermined locations with respect to a light transmitting surface (one end surface) 2a of a core 2 (at locations which are set in advance so that, when the units W and E are coupled, the light transmitting surface 2a of the optical waveguide unit W faces an optical element 10 of the electric circuit unit E). Further, in the electric circuit unit E, the fitting holes 15 into which the protruding portions 4 fit, respectively, are located and formed at predetermined locations with respect to the optical element 10 (at locations which are set in advance so that, when the units W and E are coupled, the optical element 10 of the electric circuit unit E faces the light transmitting surface 2a of the optical waveguide unit W). Therefore, in the opto-electric hybrid board, by fitting the protruding portions 4 into the fitting holes 15, respectively, the light transmitting surface 2a of the core 2 and the optical element 10 are automatically and appropriately located in an aligned state. Further, the base member S sets the optical waveguide unit at an appropriate height level and improves the strength of the opto-electric hybrid board.

Figure 2A:
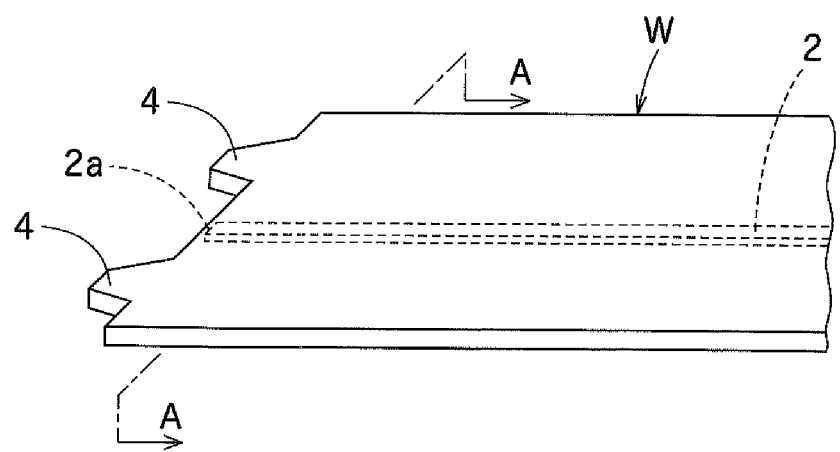
FIG. 2A is a perspective view schematically illustrating an optical waveguide unit which forms the opto-electric hybrid board.

Description is made in more detail. The optical waveguide unit W includes an undercladding layer 1, the core 2 for an optical path formed on a surface of the undercladding layer 1 in a predetermined linear pattern, and an overcladding layer 3 formed on the surface of the undercladding layer 1 so as to cover the core 2 as illustrated in FIG. 2A as a perspective view and in FIG. 2B as an enlarged sectional view of a principal part taken along the line A-A of FIG. 2A. At one edge of the optical waveguide unit W (left edge in FIG. 2A), stacked portions of the undercladding layer 1 and the overcladding layer 3 at which the core 2 does not exist are extended along an axial direction of the core 2, and the extended portions are formed into the protruding portions 4 for locating the electric circuit unit. The protruding portions 4 are located and formed at the predetermined locations with respect to the light transmitting surface 2a of the core 2. In this embodiment, the protruding portions 4 are arranged on both sides of the core 2 (in two places), and the protruding portions 4 are shaped so that the thickness (thickness in a direction of the stack of the undercladding layer 1 and the overcladding layer 3) thereof is constant and the width thereof gradually decreases in a direction of the extension and so as to be trapezoidal in front view.

Figure 3:
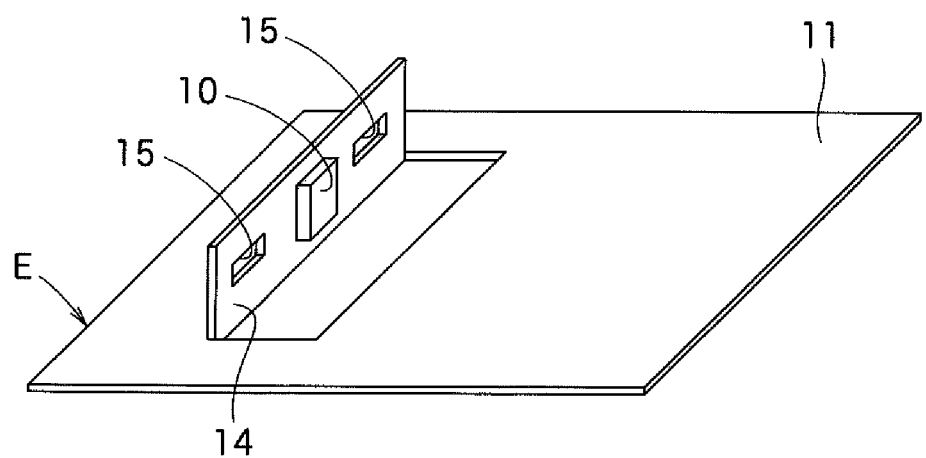
FIG. 3 is a perspective view schematically illustrating an electric circuit unit which forms the opto-electric hybrid board.

Meanwhile, the electric circuit unit E includes, as illustrated in FIG. 3 as a perspective view, a substrate 11, an insulating layer (not shown) formed on a surface (lower surface in the figure) of the substrate 11, an electric circuit (not shown) formed on a surface (lower surface in the figure) of the insulating layer, and the optical element 10 mounted on a pad for mounting the optical element which forms a part of the electric circuit. Further, in the electric circuit unit E, a portion on which the optical element 10 is mounted is formed in the bent portion 14 which is bent so as to stand upright with respect to the substrate 11 and which is formed into the shape of a rectangular plate. The bent portion 14 is formed by cutting a part of a stacked portion of the substrate 11 and the insulating layer so as to be U-shaped and causing a tongue portion surrounded by the U-shaped cut to stand upright with respect to the stacked portion. The fitting holes 15 into which the protruding portions 4 (see FIG. 2A) of the optical waveguide unit W fit are formed in the bent portion 14. The bent portion 14 and the fitting holes 15 are located and formed at predetermined locations with respect to the optical element 10. In this embodiment, the fitting holes 15 are formed on both sides of the optical element 10 (in two places), and the fitting holes 15 are formed into the shape of a rectangle.

Note that, the insulating layer is formed on the surface of the substrate 11 except for the fitting holes 15. On the surface of the insulating layer, there are formed the electric circuit which includes the pad for mounting the optical element, and further, fitting hole locating circuits (not shown) used as guides when the fitting holes 15 are located and formed, and a bent portion locating circuit (not shown) used as a guide when the bent portion 14 is located and formed. The fitting hole locating circuits are formed on the periphery of the fitting holes 15, respectively, so as to be frame-like. The bent portion locating circuit is formed along the U-shaped cut forming the tongue portion which is formed to be the bent portion 14. Further, a plating layer (not shown) is formed on surfaces of the pad for mounting the optical element, the electric circuit, the fitting hole locating circuits, and the bent portion locating circuit. In this embodiment, an element of a wire bonding type is used as the optical element 10, and a light-emitting portion or a light-receiving portion thereof is formed on a surface of the optical element (right surface in FIG. 3).

In the opto-electric hybrid board, as illustrated in FIG. 1, the optical waveguide unit W and the electric circuit unit E are coupled to be integral so as to be parallel in a state in which the protruding portions 4 of the optical waveguide unit W fit into the fitting holes 15 of the bent portion 14 of the electric circuit unit E. Here, as described above, the protruding portions 4 formed in the optical waveguide unit W are located and formed in advance at the predetermined locations with respect to the light transmitting surface 2a of the core 2. Further, the fitting holes 15 formed in the electric circuit unit E are located and formed in advance at the predetermined locations with respect to the optical element 10. Therefore, by fitting the protruding portions 4 into the fitting holes 15, the light transmitting surface 2a of the core 2 and the optical element 10 are appropriately located in an aligned state automatically. Further, the fitting of the protruding portions 4 into the fitting holes 15 is carried out with the optical element mounting portion being bent (bent portion 14), and the optical element 10 and the light transmitting surface 2a of the core 2 are in a state of being opposed to each other. Therefore, even in an opto-electric hybrid board in which the optical waveguide unit W is provided so as to be parallel to the electric circuit unit E as in this embodiment, it is not necessary to form an end surface of the core 2 as an inclined surface for reflecting light (it is not necessary to form an end surface of the core 2 as a structure for changing the optical path by 90°).

Further, in this embodiment, the protruding portions 4 of the optical waveguide unit W are formed so as to be trapezoidal, and thus, by setting the length of the openings of the rectangular fitting holes 15 of the electric circuit unit E at a predetermined value, inclined surfaces of each of the trapezoidal protruding portions 4, which are opposed to each other, may be caused to abut against both surfaces of each of the rectangular fitting holes 15, which are opposed to each other, to thereby appropriately set the fitting amount (fitting depth) of the protruding portions 4. Further, with this setting, the distance between the one end surface of the optical waveguide unit W (light transmitting surface 2a of the core 2) and the optical element 10 of the electric circuit unit E may be appropriately set. Further, even when the widths of the protruding portions 4, the lengths of the openings of the fitting holes 15, and the like are, for example, dimensionally contracted, by using the inclined surfaces of each of the trapezoidal protruding portions 4, which are opposed to each other, the protruding portions 4 may coaxially fit into the fitting holes 15, respectively, to thereby prevent misalignment between the core 2 and the optical element 10. Note that, in FIG. 1, for the sake of easy understanding, the fitting holes 15 are illustrated so as to be significantly larger in size than the protruding portions 4, but in reality, the fitting holes 15 have a size similar to that of or slightly larger than the protruding portions 4.

The opto-electric hybrid board is manufactured through the following steps (1) to (3):
(1) a step of manufacturing the optical waveguide unit W (see FIGS. 4A to 4D);
(2) a step of manufacturing the electric circuit unit E (see FIGS. 5A to 5C and FIGS. 6A to 6C); and (3) a step of coupling the optical waveguide unit W to the electric circuit unit E (see FIG. 7).

<(1) Step of Manufacturing Optical Waveguide Unit W>

The step of manufacturing the optical waveguide unit W of the above-mentioned item (1) is described. First, a plate-like base 20 (see FIG. 4A) used when the undercladding layer 1 is formed is prepared. The forming material for the base 20 is, for example, glass, quartz, silicon, a resin, or a metal. Among them, a substrate formed of a stainless steel is preferred, because a substrate formed of a stainless steel is excellent in resistance to expansion and contraction due to heat and various dimensions thereof are substantially maintained at design values in the process of manufacturing the optical waveguide unit W. Further, the thickness of the base 20 is set within a range of, for example, 20 μm to 1 mm.

Figure 4A:
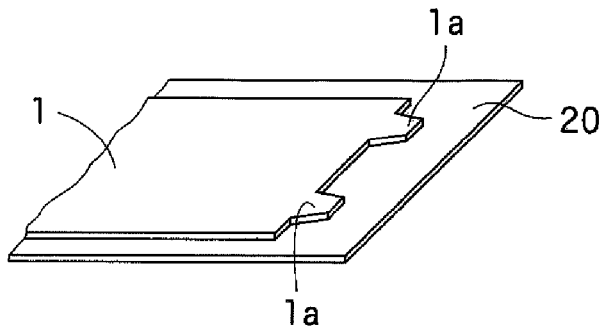
FIGS. 4A to 4D are explanatory views schematically illustrating manufacturing steps for the optical waveguide unit in a manufacturing method for the opto-electric hybrid board.

Next, as illustrated in FIG. 4A, the undercladding layer 1 is formed by photolithography in a predetermined region on a surface of the base 20, the undercladding layer 1 having in two places at one edge thereof protruding pieces 1a which are trapezoidal in plan view. As the forming material for the undercladding layer 1, a photosensitive resin such as a photosensitive epoxy resin is used. The thickness of the undercladding layer 1 is set within a range of, for example, 5 to 50 μm.

Figure 4B:
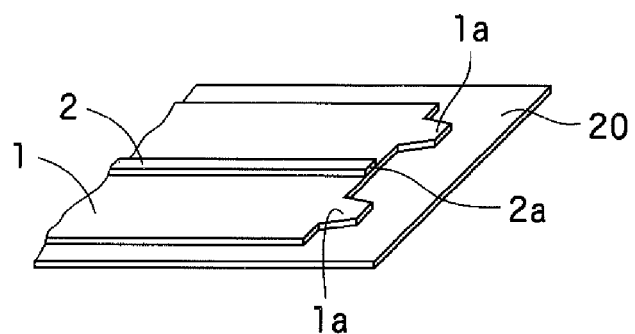

Then, as illustrated in FIG. 4B, the core 2 in the predetermined pattern is formed by photolithography on the surface of the undercladding layer 1. Here, the light transmitting surface (one end surface) 2a of the core 2 is located at a predetermined location between the protruding pieces 1a in the two places on the surface of the undercladding layer 1 with reference to the protruding pieces 1a in the two places. The locating of the core 2 is carried out by, in a state in which a photomask formed with reference to the protruding pieces 1a in the two places is placed with respect to the protruding pieces 1a in the two places, performing exposure via the photomask when the core 2 is formed by photolithography.

The forming material for the core 2 is, for example, a photosensitive resin similar to the case of the undercladding layer 1, and a material having the refractive index higher than those of forming materials for the undercladding layer 1 and the overcladding layer 3 (see FIG. 4C) is used. The adjustment of the refractive index may be made by, for example, selecting the kinds of and adjusting the composition ratios of the forming materials for the undercladding layer 1, the core 2, and the overcladding layer 3. The number of the cores may be one or more than one (one in the case illustrated in FIG. 4B). The pattern of the core 2 is, for example, in the shape of a straight line, branched, or crossed, or may be a combination thereof (in the shape of a straight line in the case illustrated in FIG. 4B). The thickness of the core 2 is set within a range of, for example, 20 to 100 μm. The width of the core 2 is set within a range of, for example, 20 to 100 μm.

Figure 4C:
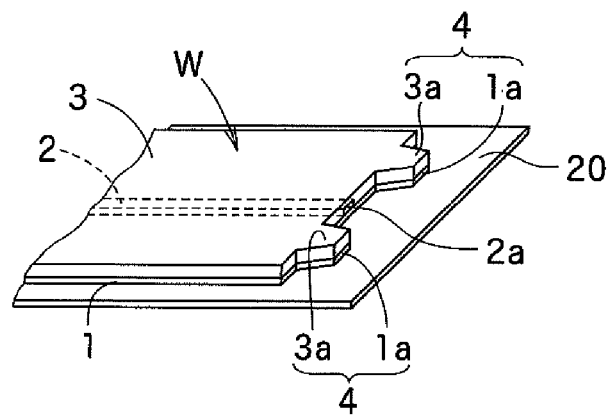

Then, as illustrated in FIG. 4C, the overcladding layer 3 is formed by photolithography on the surface of the undercladding layer 1 so as to cover the core 2. Here, protruding pieces 3a in the same shape as that of the protruding pieces 1a are formed on the protruding pieces 1a of the undercladding layer 1. The forming material for the overcladding layer 3 is, for example, a photosensitive resin similar to the case of the undercladding layer 1. The thickness of the overcladding layer 3 (thickness from the surface of the undercladding layer 1) is set within a range of, for example, a thickness greater than the thickness of the core 2 and a thickness of 1,000 μm or smaller.

Here, stacked portions of the protruding pieces 1a of the undercladding layer 1 and the protruding pieces 3a of the overcladding layer formed thereon are the protruding portions 4 for locating the electric circuit unit. As described above, the light transmitting surface 2a of the core 2 is located and formed at the predetermined location with respect to the protruding pieces 1a of the undercladding layer 1, and thus, the protruding portions 4 formed by stacking the protruding pieces 3a of the overcladding layer on the protruding pieces 1a are located and formed at the predetermined locations with respect to the light transmitting surface 2a of the core 2. With regard to the dimensions of the protruding portions 4, the amount of the protrusions is set within a range of, for example, 300 to 5,000 μm, and the width is set within a range of 100 to 5,000 μm.

Figure 4D:
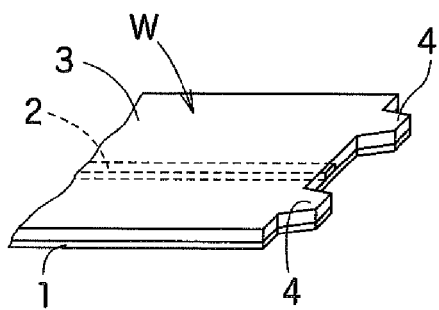

Then, as illustrated in FIG. 4D, the base 20 (see FIG. 4C) is separated from a rear surface of the undercladding layer 1. With the separation, the optical waveguide unit W is obtained, which includes the undercladding layer 1, the core 2, and the overcladding layer 3 and in which the protruding portions 4 for locating the electric circuit unit are provided by extending the stacked portions of the undercladding layer 1 and the overcladding layer 3. The thickness of the optical waveguide unit W is set within a range of, for example, 30 to 1,150 μm. In this way, the step of manufacturing the optical waveguide unit W of the above-mentioned item (1) is completed.

<(2) Step of Manufacturing Electric Circuit Unit E>

Next, the step of manufacturing the electric circuit unit E of the above-mentioned item (2) is described with reference to FIGS. 5A to 5C and FIGS. 6A to 6C. Each of FIGS. 5A to 5C and 6A to 6C has two figures side by side, and the left figures are plan views while the right figures are longitudinal sectional views taken along the center lines of the left figures, respectively.

First, the substrate 11 (see FIG. 5A) is prepared. The forming material for the substrate 11 is, for example, a metal or a resin. Among them, a substrate formed of a stainless steel is preferred from the viewpoint of easy processability and dimensional stability. Further, the thickness of the substrate 11 is set within a range of, for example, 0.02 to 0.1 mm.

Figure 5A:
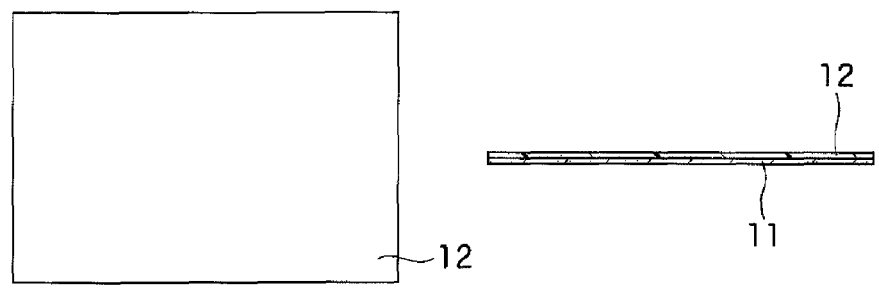
FIGS. 5A to 5C are explanatory views schematically illustrating manufacturing steps for the electric circuit unit in the manufacturing method for the opto-electric hybrid board.

Then, as illustrated in FIG. 5A, an insulating layer 12 is formed in a predetermined region of the surface of the substrate 11. With regard to the formation of the insulating layer 12, for example, varnish in which a photosensitive resin such as a photosensitive polyimide resin for forming an insulating layer is dissolved in a solvent is applied, and then, as necessary, the layer formed by applying the varnish is dried by heating treatment to form a photosensitive resin layer for forming the insulating layer. Then, by exposing the photosensitive resin layer to a radiation ray such as an ultraviolet ray via a photomask, the insulating layer 12 in a predetermined shape is formed. The thickness of the insulating layer 12 is set within a range of, for example, 5 to 15 μm.

Figure 5B:
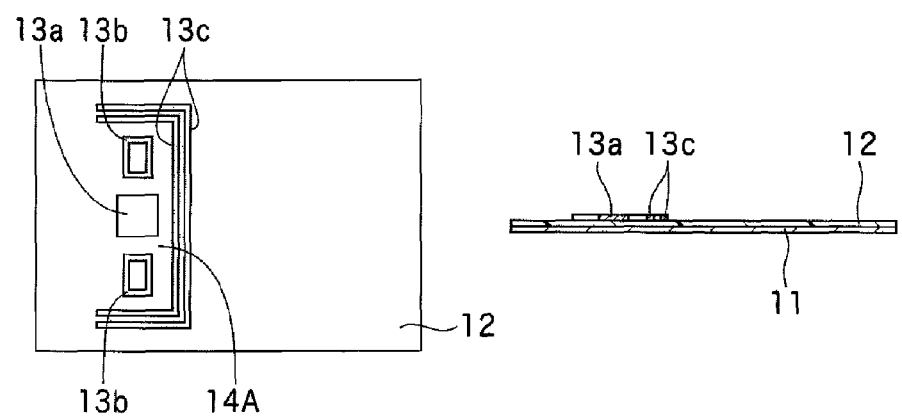

Then, as illustrated in FIG. 5B, the electric circuit (not shown) including a pad 13a for mounting the optical element, frame-like fitting hole locating circuits 13b, and a U-shaped bent portion locating circuit 13c are simultaneously formed on a surface of the insulating layer 12, to thereby manufacture an electric circuit board. The formation of the electric circuit and the like is carried out by, for example, a semi-additive process.

More specifically, first, a metal layer (having a thickness of about 60 to 260 nm) is formed on the surface of the insulating layer 12 by sputtering, electroless plating, or the like. The metal layer becomes a seed layer when electrolytic plating is applied later (layer to be a base metal when an electrolytic plating layer is formed). Then, after dry film resists are adhered to both surfaces of a laminate including the substrate 11, the insulating layer 12, and the seed layer, hole portions of the pattern of the electric circuit and the like are simultaneously formed by photolithography in the dry film resist on a side having the seed layer formed thereon, and surface portions of the seed layer are exposed at the bottom of the hole portions. Then, an electrolytic plating layer (having a thickness of about 5 to 20 μm) is stacked by electrolytic plating on the surface portions of the seed layer exposed at the bottom of the hole portions. Then, the dry film resists are separated by a sodium hydroxide solution or the like. After that, portions of the seed layer which do not have the electrolytic plating layer formed thereon are removed by soft etching, and a stacked portion including the remaining electrolytic plating layer and the seed layer thereunder is formed into the electric circuit and the like. In this way, the electric circuit board is obtained, which includes the substrate 11, the insulating layer 12, the electric circuit including the pad 13a for mounting the optical element, the fitting hole locating circuits 13b, and the bent portion locating circuit 13c.

Figure 5C:
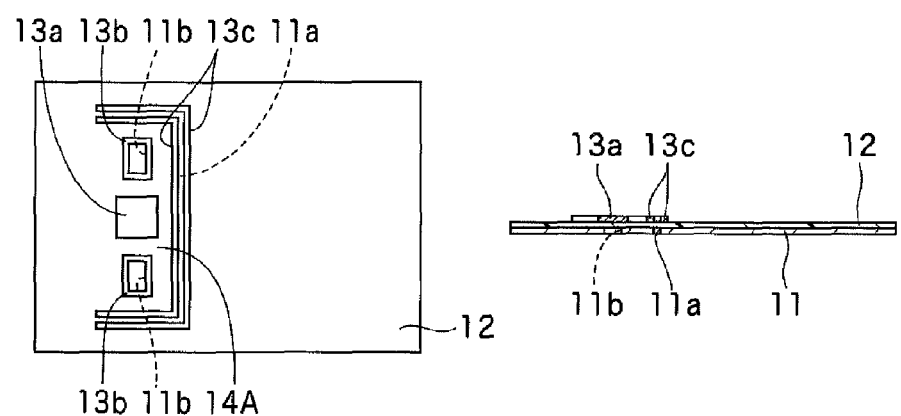

Then, the electric circuit board is set in an exposure machine, and an image of a front surface side (electric circuit side) and an image of a rear surface side (substrate 11 side) are taken by a camera. Based on the images, the locations of expected fitting hole forming portions (portions which correspond to the inside of the frame-like fitting hole locating circuits 13b) on the rear surface side are appropriately located with the frame-like fitting hole locating circuits 13b on the front surface side being used as guides, and the location of an expected bent portion forming portion (tongue portion 14A) on the rear surface side is appropriately located with the bent portion locating circuit 13c on the front surface side being used as a guide. Then, the rear surface side except for the expected fitting hole forming portions and an expected U-shaped cut forming portion for forming the tongue-like expected bent portion forming portion is covered with a dry film resist (not shown). Then, as illustrated in FIG. 5C, the exposed portions of the substrate 11 at the expected fitting hole forming portions and the expected U-shaped cut forming portion are removed by etching using a ferric chloride solution. The etching exposes the portions of the insulating layer 12 from portions 11a and 11b removed by the etching.

Then, as illustrated in FIG. 6A, the exposed portions of the insulating layer 12 are removed by etching using a chemical etchant. This forms the expected fitting hole forming portions into the fitting holes 15, and further, forms the expected U-shaped cut forming portion into a U-shaped cut 16 (U-shaped through opening). The fitting holes 15 and the U-shaped cut 16 are formed with reference to the frame-like fitting hole locating circuits 13b and the bent portion locating circuit 13c which are formed simultaneously with the pad 13a for mounting the optical element by the semi-additive process, and thus the fitting holes 15 and the U-shaped cut 16 are located and formed at predetermined locations with respect to the pad 13a for mounting the optical element. The length and width of the openings of the fitting holes 15 are set to be equivalent to or slightly larger (by, for example, about 1 to 100 μm) than the length and width of the fitting portions of the protruding portions 4 (see FIG. 1) of the optical waveguide unit W which fit into the fitting holes 15.

Then, by performing electrolytic plating processing, a plating layer (not shown) is formed on surfaces of the electric circuit including the pad 13a for mounting the optical element, the fitting hole locating circuits 13b, and the bent portion locating circuit 13c. After that, the dry film resist is separated by a sodium hydroxide solution or the like. Note that, examples of the component of the plating layer include gold, nickel, or the like. Further, the thickness of the plating layer is ordinarily set within a range of, for example, 0.2 to 0.5 μm.

Then, as illustrated in FIG. 6B, the optical element 10 is mounted on the surface of the pad 13a for mounting the optical element via the plating layer. After that, as necessary, the optical element 10 and portions therearound are encapsulated in resin (not shown).

Then, as illustrated in FIG. 6C, the tongue portion 14A surrounded by the U-shaped cut 16 (see FIG. 6B) and having the optical element 10 mounted thereon is bent down so as to protrude perpendicularly to the electric circuit board to be formed into the bent portion 14. In other words, the optical element 10 is mounted at a predetermined location of the bent portion 14. In this way, the electric circuit unit E having the fitting holes 15 and the bent portion 14 is obtained. Here, as described above, the fitting holes 15 formed in the step illustrated in FIG. 6A are located and formed at the predetermined locations with respect to the pad 13a for mounting the optical element, and hence the optical element 10 mounted on the pad 13a for mounting the optical element and the fitting holes 15 are in a positional relationship of being located with respect to each other. In this way, the step of manufacturing the electric circuit unit E of the above-mentioned item (2) is completed.

<(3) Step of Coupling Optical Waveguide Unit W and Electric Circuit Unit E>

Figure 7:
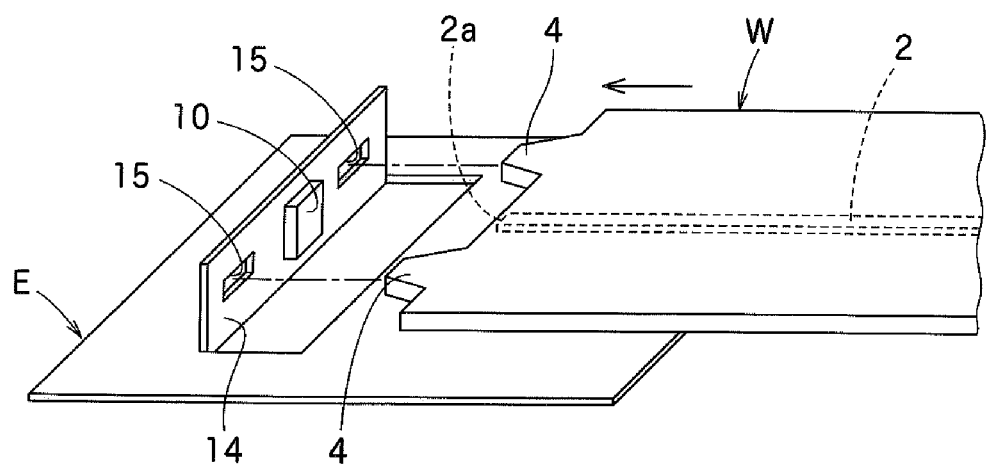
FIG. 7 is an explanatory view schematically illustrating a manufacturing step of the opto-electric hybrid board.

Next, the step of coupling the optical waveguide unit W and the electric circuit unit E is described. In this coupling, as illustrated in FIG. 7 as a perspective view (the electric circuit unit E illustrated in FIG. 6C is turned upside down), in a state in which the optical element 10 on the bent portion 14 of the electric circuit unit E and the light transmitting surface 2a of the core 2 of the optical waveguide unit W are opposed to each other, the protruding portions 4 of the optical waveguide unit W are caused to fit into the fitting holes 15 of the bent portion 14, respectively, to integrate the optical waveguide unit W and the electric circuit unit E. After that, as necessary, fitting portions of the protruding portions 4 and the fitting holes 15 are fixed with an adhesive. Then, the optical waveguide unit W is placed on the surface of the electric circuit unit E via the base member S (see FIG. 1). After that, as necessary, the optical waveguide unit W and the electric circuit unit E may be fixed via the base member S using an adhesive, an adhesive tape, or the like. In this way, the step of coupling the optical waveguide unit W and the electric circuit unit E of the above-mentioned item (3) is completed, and the opto-electric hybrid board is completed which is the goal.

Here, as described above, in the optical waveguide unit W, the light transmitting surface 2a of the core 2 and the protruding portions 4 for locating the electric circuit unit are in a positional relationship of being located with respect to each other. Further, in the electric circuit unit E having the optical element 10 mounted thereon, the optical element 10 and the fitting holes 15 into which the protruding portions 4 fit, respectively, are in a positional relationship of being located with respect to each other. Therefore, when the protruding portions 4 are caused to fit into the fitting holes 15, respectively, as described above to manufacture the opto-electric hybrid board, the light transmitting surface 2a of the core 2 and the optical element 10 are automatically aligned. As a result, in manufacturing the opto-electric hybrid board, an aligning operation which takes time and effort is not necessary. In other words, the opto-electric hybrid board is excellent in mass-productivity.

In addition, the protruding portions 4 of the optical waveguide unit W are provided by extending predetermined portions of the undercladding layer 1 and the overcladding layer 3 which form the optical waveguide unit W. Further, the fitting holes 15 of the electric circuit unit E are formed in the electric circuit board which forms the electric circuit unit E. In other words, an additional component such as a connector is not provided for the purpose of fitting the protruding portions 4 into the fitting holes 15. Therefore, in the coupling between the optical waveguide unit W and the electric circuit unit E, there is no accumulation of dimensional deviations and misalignments due to an additional component such as a connector, and the core 2 of the optical waveguide unit W and the optical element 10 of the electric circuit unit E are aligned with high accuracy. Further, an additional component such as a connector is not necessary for the fit between the protruding portions 4 and the fitting holes 15, and thus control of the dimensional accuracy of the connector or the like is not necessary. In this regard, also, the opto-electric hybrid board is excellent in mass-productivity.

Further, the fitting of the protruding portions 4 into the fitting holes 15 is carried out with the optical element mounting portion being bent (bent portion 14), and the optical element 10 and the light transmitting surface 2a of the core 2 are in a state of being opposed to each other. Therefore, even in a manufacturing method for an opto-electric hybrid board in which the optical waveguide unit W is provided so as to be parallel to the electric circuit unit E as in this embodiment, it is not necessary to form an end surface of the core 2 as an inclined surface for reflecting light (it is not necessary to form an end surface of the core 2 as a structure for changing the optical path by 90°).

Note that, in the above-mentioned embodiment, usually, the height of the optical element 10 is greater than the thickness of the optical waveguide unit W, and thus, in a state in which the light transmitting surface 2a of the core 2 and the optical element 10 are aligned with each other in the bent portion 14 having the optical element 10 mounted thereon as described above, a gap is formed between the electric circuit unit E and the optical waveguide unit W. The base member S is provided for the purpose of filling the gap, that is, adjusting the height of the optical waveguide unit W with respect to the electric circuit unit E.

Figure 8:
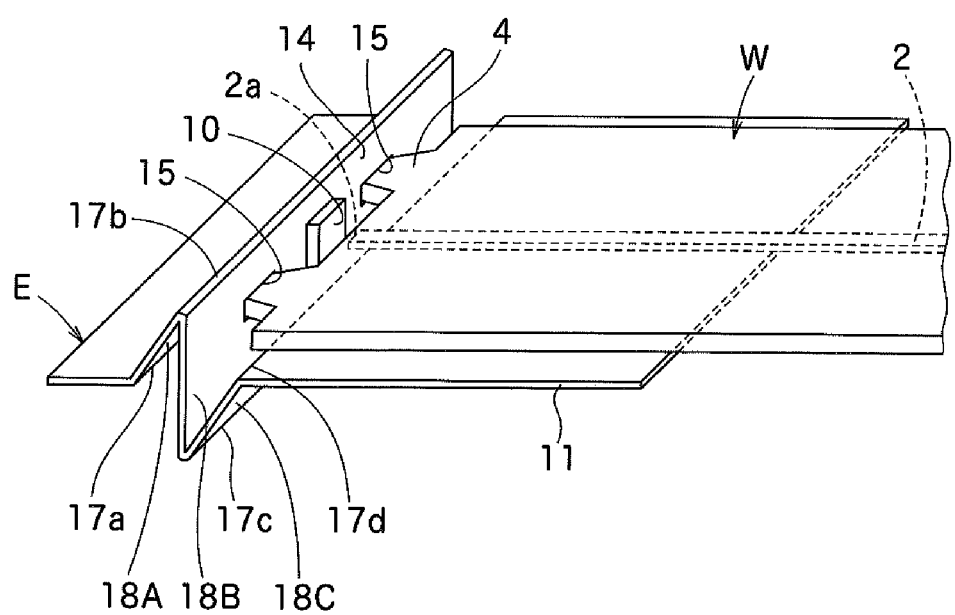
FIG. 8 is a perspective view schematically illustrating a second embodiment of the opto-electric hybrid board.

FIG. 8 is a perspective view schematically illustrating a second embodiment of the opto-electric hybrid board. In this embodiment, as illustrated in the figure, the bent portion 14 of the electric circuit unit E is formed by bending the electric circuit unit E along four bend lines 17a to 17d provided in parallel to one another. Therefore, three plate portions 18A to 18C are formed between adjacent bend lines among the bend lines 17a to 17d. Similarly to the case of the first embodiment, the optical element 10 is mounted and the fitting holes 15 into which the protruding portions 4 of the optical waveguide unit W fit are formed at predetermined locations of the plate portion 18B which is the middle of the three plate portions 18A to 18C. The middle plate portion 18B is perpendicular to the substrate 11 of the electric circuit unit E.

In this second embodiment, the bend lines 17a to 17d are located and formed at predetermined locations with respect to the optical element 10. By forming the bent portion 14 by the bending along the bend lines 17a to 17d, the height level of the surface of the electric circuit unit E on which the optical waveguide unit W is placed may be set at a predetermined height level. Therefore, a gap between the electric circuit unit E and the optical waveguide unit W may be prevented from being formed in a state in which the protruding portions 4 of the optical waveguide unit W fit into the fitting holes 15 of the electric circuit unit E, respectively, and the light transmitting surface 2a of the core 2 and the optical element 10 are aligned with each other. Therefore, in this second embodiment, the base member S (see FIG. 1) provided in the first embodiment is omitted. Other portions of the electric circuit unit E and the optical waveguide unit W are similar to those of the first embodiment illustrated in FIG. 1, and like reference numerals are used to designate like members. The second embodiment produces actions and effects similar to those of the first embodiment.

In this second embodiment, the predetermined bend lines 17a to 17d for forming the bent portion 14 of the electric circuit unit E may be formed by half-etching the substrate 11 at predetermined locations with reference to the pad 13a for mounting the optical element in the step of etching the substrate 11 of the electric circuit unit E (see FIG. 5C).

Figure 9A:
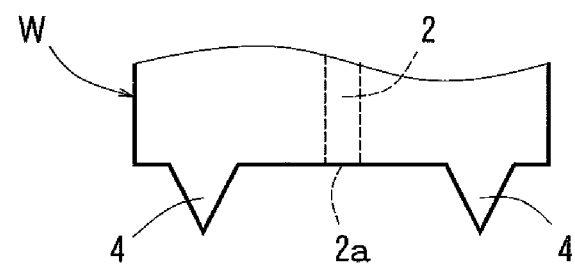
FIGS. 9A and 9B are front views schematically illustrating modification examples of protruding portions for positioning the electric circuit unit formed in the optical waveguide unit.
Figure 9B:
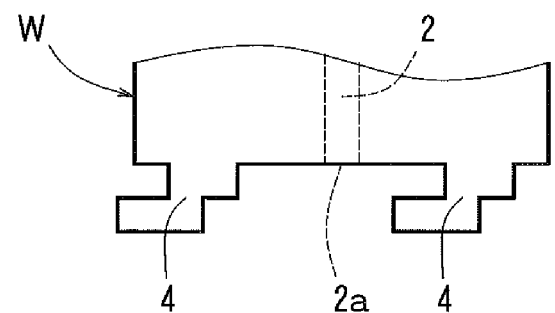

FIGS. 9A and 9B are front views schematically illustrating modification examples of the protruding portions 4 for locating the electric circuit unit. Specifically, in FIG. 9A, the protruding portions 4 are formed so as to be triangular. In this case, similarly to the case of the trapezoidal protruding portions 4 illustrated in FIG. 1, inclined surfaces of the triangles may be used to appropriately set the distance between the one end surface of the optical waveguide unit W (light transmitting surface 2a of the core 2) and the optical element 10 of the electric circuit unit E, and also, misalignment between the core 2 and the optical element may be prevented (see FIG. 1). In FIG. 9B, the protruding portions 4 are formed so as to be stepped. In this case, after the protruding portions 4 fit into the fitting holes 15 (see FIG. 1), the protruding portions 4 are less liable to come out of the fitting holes 15. In addition to the above, for example, the protruding portions 4 may be formed so as to be semicircular.

FIGS. 10A to 10D schematically illustrate a method using molding as another manufacturing step (manufacturing method) for the overcladding layer 3 including the protruding pieces 3a (see FIG. 4C) in manufacturing the optical waveguide unit W. Specifically, in the above-mentioned respective embodiments, the overcladding layer 3 including the protruding pieces 3a is formed by photolithography, but the overcladding layer 3 may be formed by molding, which is carried out as follows.

Figure 10A:
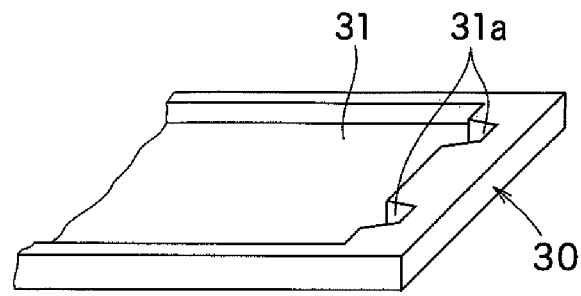
FIGS. 10A to 10D are explanatory views schematically illustrating another series of manufacturing steps for the optical waveguide unit.
Figure 10B:
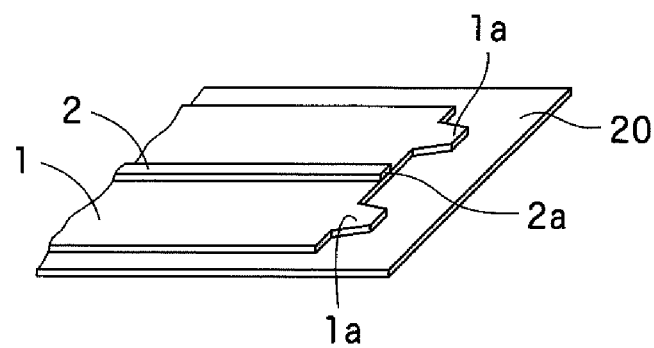
Figure 10C:
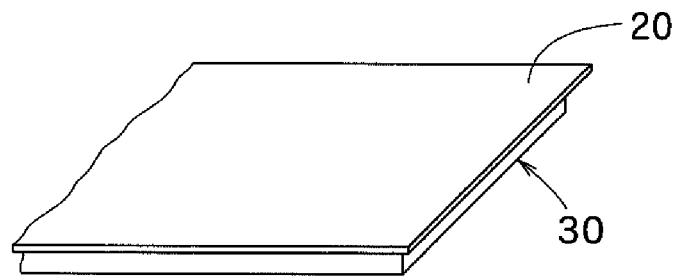
Figure 10D:
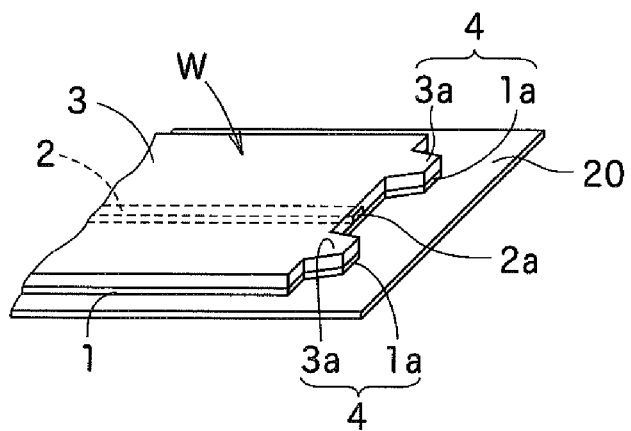

More specifically, first, as illustrated in FIG. 10A, a mold 30 is prepared which has in an upper surface thereof a recess having a mold surface 31 corresponding to the shape of the overcladding layer 3 including the protruding pieces 3a. Next, as illustrated in FIG. 10B (similarly to the case illustrated in FIG. 4B), the undercladding layer 1 having the protruding pieces 1a is formed on the surface of the base 20, and the core 2 in a predetermined pattern is formed on the surface of the undercladding layer 1. Then, as illustrated in FIG. 10C, after the recess of the mold 30 is filled with a resin for forming the overcladding layer, the surface of the base 20 is brought into intimate contact with the upper surface of the mold 30 so that the core 2 is immersed in the resin (the structure illustrated in FIG. 10B is turned upside down). Here, portions 31a of the mold surface of the mold 30 corresponding to the protruding pieces 3a are located over the protruding pieces 1a of the undercladding layer 1. Then, in a case where the resin is a photosensitive resin, exposure is carried out by applying a radiation ray such as an ultraviolet ray via the mold 30, and then heating treatment is carried out. In a case where the resin is a thermosetting resin, heating treatment is carried out. This cures the resin for forming the overcladding layer to form the overcladding layer 3 including the protruding pieces 3a. After that, the mold is stripped off, and as illustrated in FIG. 10D (the structure obtained by stripping off the mold from the state illustrated in FIG. 10C is illustrated upside down), a structure similar to that illustrated in FIG. 4C is obtained. The formation may be carried out in this way.

FIGS. 11A to 11D schematically illustrate manufacturing steps for the optical waveguide unit W in another form. Specifically, in the above-mentioned respective embodiments, the protruding portions 4 for locating the electric circuit unit in the optical waveguide unit W are provided by extending the stacked portions of the undercladding layer 1 and the overcladding layer 3 (see FIG. 4C), but the protruding portions 4 may be provided by extending only the overcladding layer 3. Manufacturing steps (manufacturing method) for the optical waveguide unit W are as follows.

Figure 11A:
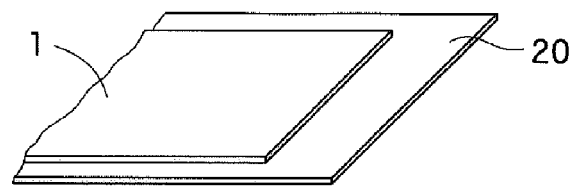
FIGS. 11A to 11D are explanatory views schematically illustrating manufacturing steps for the optical waveguide unit in another form.
Figure 11B:
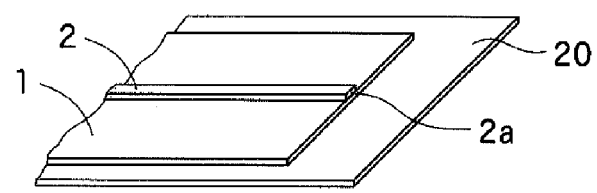
Figure 11C:
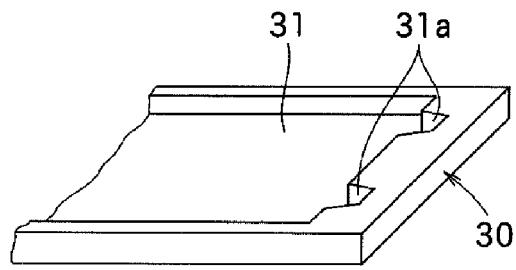
Figure 11D:
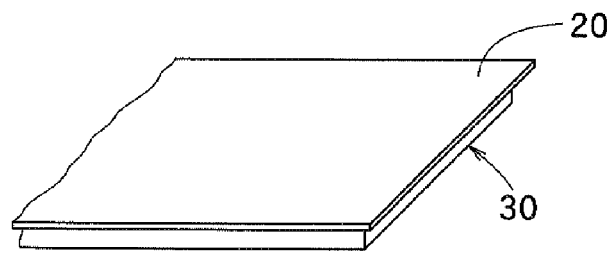
Figure 12:
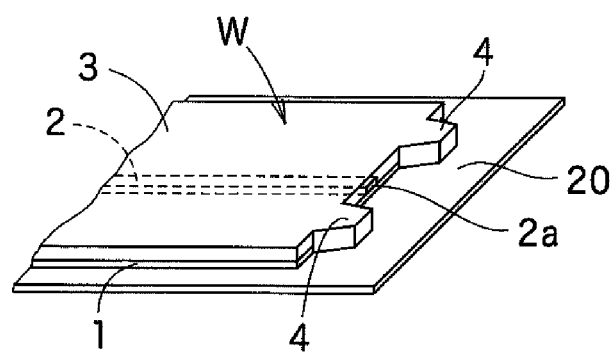
FIG. 12 is a perspective view schematically illustrating the optical waveguide unit in another form.

More specifically, first, as illustrated in FIG. 11A, the undercladding layer 1 without the protruding pieces 1a (see FIG. 4A) is formed in a predetermined region on the surface of the base 20 by photolithography. Then, as illustrated in FIG. 11B, the core 2 in the predetermined pattern is formed by photolithography on the surface of the undercladding layer 1. Next, as illustrated in FIG. 11C, a mold 30 is prepared which has in an upper surface thereof a recess having a mold surface 31 corresponding to the shape of the overcladding layer 3 including the protruding portions 4. Then, as illustrated in FIG. 11D, after the recess of the mold 30 is filled with a resin for forming the overcladding layer, the surface of the base 20 is brought into intimate contact with the upper surface of the mold 30 so that the core 2 is immersed in the resin. Here, portions 31a of the mold surface of the mold 30 corresponding to the protruding portions 4 are located with respect to the light transmitting surface 2a of the core 2. After that, similarly to the method described above with reference to FIG. 10C, the overcladding layer 3 including the protruding portions 4 is formed. After that, the mold is stripped off, and, as illustrated in FIG. 12, the optical waveguide unit W in which the protruding portions 4 are provided by extending only the overcladding layer 3 is obtained on the surface of the base 20. Alternatively, the overcladding layer 3 may be formed by, instead of the above-mentioned molding (see FIGS. 11C and 11D), photolithography.

Note that, in the above embodiment (see FIGS. 11A to 11D), the protruding portions 4 for locating the electric circuit unit are provided by extending only the overcladding layer 3, but the protruding portions 4 for locating the electric circuit unit may be provided by extending only the undercladding layer 1. Manufacturing steps (manufacturing method) for such an optical waveguide unit W are as follows. The undercladding layer 1 having the protruding pieces 1a is formed on the surface of the base 20. In a state in which the core 2 is formed in the predetermined pattern on the surface of the undercladding layer 1 (similar to the state illustrated in FIG. 4B), the overcladding layer 3 without the protruding pieces 3a (see FIG. 4C) is formed by molding or by photolithography, and thus the optical wave guide unit W may be manufactured.

Figure 13A:
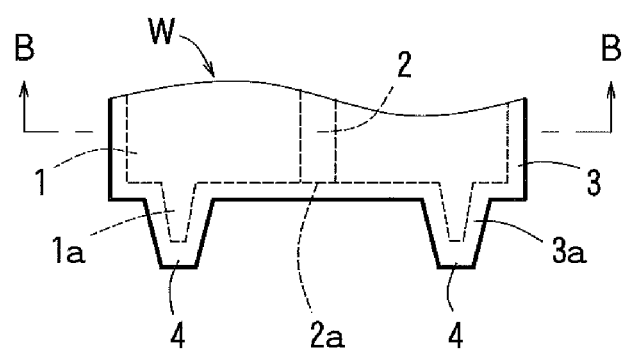
Figure 13B:
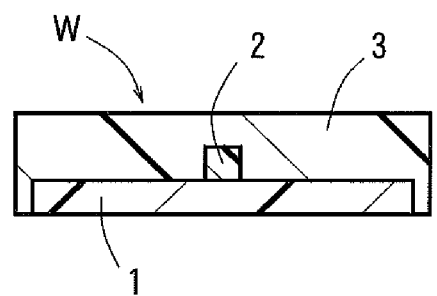

FIGS. 13A and 13B schematically illustrate the optical waveguide unit W instill another form. In this embodiment, as illustrated in FIG. 13A as a front view and FIG. 13B as a sectional view taken along the line B-B of FIG. 13A, the overcladding layer 3 is formed so as to be slightly larger than the undercladding layer 1. Such an optical waveguide unit W may also be manufactured by molding or by photolithography described above.

When the protruding portions 4 for locating the electric circuit unit are formed by molding (see FIGS. 10A to 10C, FIGS. 11A to 11D, and FIGS. 13A and 13B), the thickness of the protruding portions 4 may be formed to be thick, and thus, in a state in which the protruding portions 4 fit into the fitting holes 15 of the electric circuit unit E, the strength of the fitting portions may be enhanced. Further, in the case of the above-mentioned molding, by changing the shape of the portions 31a of the mold surface of the mold 30 corresponding to the protruding portions 4, the protruding portions 4 may be formed so that the thickness thereof gradually decreases in a direction of the extension.

Figure 14:
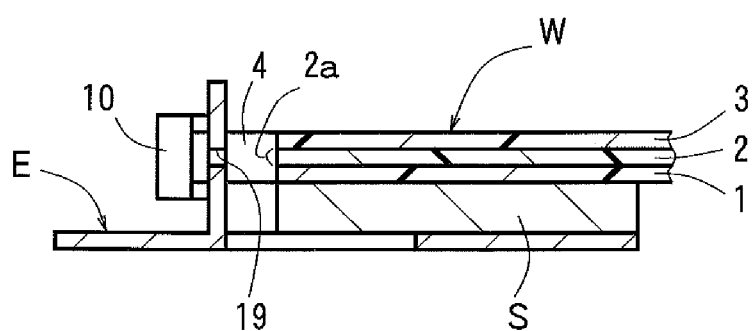
FIG. 14 is a sectional view schematically illustrating a third embodiment of the opto-electric hybrid board.
Figure 15:
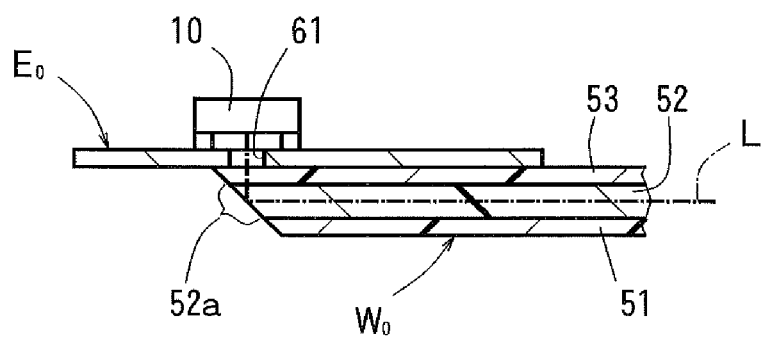
FIG. 15 is a sectional view schematically illustrating a conventional opto-electric hybrid board.

Note that, in the above-mentioned respective embodiments, an element of the wire bonding type is used as the optical element 10, but an element of a flip chip type may also be used. When such an element of a flip chip type is used, the light-emitting portion or the light-receiving portion is formed on a surface on which the optical element 10 is mounted (rear surface), and thus, as illustrated in FIG. 14, the optical waveguide unit W is fitted into the electric circuit unit E from the side on which the optical element 10 is not mounted, and a through hole 19 for passing light therethrough is formed at a portion of the electric circuit unit E which corresponds to the light-emitting portion or the light-receiving portion.

Further, in the above-mentioned respective embodiments, description is made with regard to one end of the opto-electric hybrid board, but the other end may have a structure which is similar to that of the one end of the above-mentioned respective embodiments. In this case, as the optical element 10, by, for example, mounting a light-emitting element on the one end side and mounting a light-receiving element on the other end side, light from the light-emitting element may be received by the light-receiving element via the core 2.

Further, in the above-mentioned respective embodiments, in the step of manufacturing the electric circuit unit E, the plating layer is formed on the surfaces of the electric circuit, the pad 13a for mounting the optical element, the fitting hole locating circuits 13b, and the bent portion locating circuit 13c, but the plating layer is formed as necessary, and is not required to be formed when unnecessary.

Next, examples are described. However, the present invention is not limited to the examples.

EXAMPLES

<Forming Materials for Undercladding Layer and Overcladding Layer>

Component A: epoxy resin including an alicyclic skeleton (EHPE3150 manufactured by Daicel Chemical Industries Ltd.) 100 parts by weight Component B: photoacid generator (CPI-200K manufactured by San-Apro Ltd.) 2 parts by weight By dissolving those Components A and B in cyclohexanone, the undercladding layer and overcladding layer forming material (photosensitive resin composition) was prepared.

<Forming Material for Core>

Component C: o-cresol novolak glycidyl ether (YDCN-700-10 manufactured by Nippon Steel Chemical Co., Ltd) 100 parts by weight This Component C and 1 part by weight of the above-mentioned Component B were dissolved in ethyl lactate to prepare the core forming material (photosensitive resin composition).

Example 1

<Manufacture of Optical Waveguide Unit>

Figure 2B:
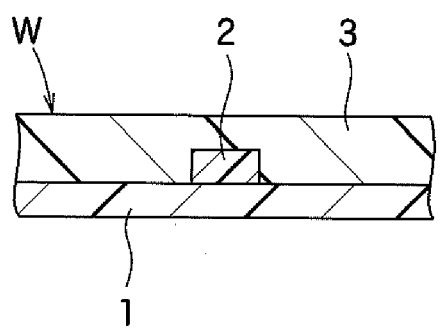
FIG. 2B is an enlarged sectional view of a principal part taken along the line A-A of FIG. 2A.

The above-mentioned undercladding layer, core, and overcladding layer forming materials were used to manufacture the optical waveguide unit having isosceles trapezoidal protruding portions for locating the electric circuit unit similarly to the case of the first embodiment (see FIGS. 2A and 2B). With regard to the dimensions of the isosceles trapezoidal protruding portions, the width of the longer parallel side was 2.5 mm, the width of the shorter parallel side was 1.0 mm, the height (length of the protrusion) was 3.0 mm, and the center-to-center distance between the adjacent protruding portions was 6.5 mm.

<Manufacture of Electric Circuit Unit>

The electric circuit unit having the optical element mounted on the bent portion and the rectangular fitting holes into which the protruding portions for locating the electric circuit unit fit was manufactured similarly to the case of the first embodiment (see FIG. 3). With regard to the dimensions of the fitting holes, the length of the openings was 2.5 mm, the width of the openings was 0.1 mm, and the center-to-center distance between the adjacent fitting holes was 6.5 mm. Note that, as the optical element, a light-emitting element which was usable as a wire bonding type (ULM850-10-CO0104U manufactured by U-L-M Photonics) was mounted.

<Manufacture of Opto-Electric Hybrid Board>

The protruding portions of the optical waveguide unit were caused to fit into the fitting holes of the electric circuit unit to integrate the optical waveguide unit and the electric circuit unit. Then, the fitting portions were fixed with an adhesive. Further, the base member was provided between the optical waveguide unit and the electric circuit unit.

<Light Propagation Test>

A current was caused to flow through the light-emitting element of the opto-electric hybrid board of Example 1 and light was caused to exit from the light-emitting element. It was confirmed that light exited from the other end of the core of the opto-electric hybrid board.

Example 2

<Manufacture of Optical Waveguide Unit>

An optical waveguide unit was manufactured, which was the optical waveguide unit of Example 1 with the other end having, similarly to the one end, isosceles trapezoidal protruding portions for locating the electric circuit unit. Other portions of Example 2 were formed similarly to those of Example 1.

<Manufacture of Electric Circuit Unit>

An electric circuit unit similar to the one in Example 1 was manufactured. Further, the electric circuit unit formed was the electric circuit unit in Example 1 having, instead of the light-emitting element, a light-receiving element of a wire bonding type (PDCA04-70-GS manufactured by Albis Optoelectronics) mounted thereon.

<Manufacture of Opto-Electric Hybrid Board>

Similarly to the case of Example 1, the electric circuit unit having the light-emitting element mounted thereon was fixed to one end of the optical waveguide unit and the electric circuit unit having the light-receiving element mounted thereon was fixed to the other end of the optical waveguide unit.

<Signal Transmission Test>

A current was caused to flow through the light-emitting element of the opto-electric hybrid board of Example 2, and light was caused to exit from the light-emitting element. It was confirmed that the light was received by the light-receiving element.

From the result of Examples 1 and 2 above, it can be found that, in the manufacturing method described above, even without an aligning operation of the core of the optical waveguide unit and the optical element (light-emitting element or light-receiving element) of the electric circuit unit, the obtained opto-electric hybrid board may appropriately propagate light.

Note that, a result was obtained that the opto-electric hybrid boards formed as described in the second embodiment above (see FIG. 8) and illustrated in FIGS. 9 to 14 could also appropriately propagate light even without an aligning operation as in Examples 1 and 2 above.

The opto-electric hybrid board according to the present invention may be used in an information-communication device, a signal processing device, or the like, which transmits and processes at high speed a digital audio signal, a digital image signal, or the like.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An opto-electric hybrid board, comprising:
an optical waveguide unit; and
an electric circuit unit having an optical element mounted thereon, the electric circuit unit and the optical waveguide unit being coupled and parallel to each other,
wherein the optical waveguide unit comprises:
an undercladding layer;
a core for an optical path, the core being formed on a surface of the undercladding layer;
an overcladding layer which covers the core; and
a protruding portion for locating the electric circuit unit, the protruding portion being extendingly provided at a portion of at least one of the undercladding layer and the overcladding layer;
wherein the electric circuit unit comprises:
an electric circuit board;
the optical element mounted on the electric circuit board;
a bent portion formed by bending an optical element mounting portion of the electric circuit board; and
a fitting hole which is formed in the bent portion and into which the protruding portion fits;
wherein the protruding portion of the optical waveguide unit is located and formed at a predetermined location with respect to a light transmitting surface of the core;
wherein the optical element of the electric circuit unit is located and mounted at a predetermined location of the bent portion;
wherein the fitting hole formed in the bent portion is located and formed at a predetermined location with respect to the optical element; and
wherein the optical waveguide unit and the electric circuit unit are coupled to each other in a state in which the protruding portion of the optical waveguide unit fits into the fitting hole of the electric circuit unit, such that the optical waveguide unit and the electric circuit unit are in an overlapping relationship, in a direction perpendicular to a longitudinal direction of the core of the optical waveguide unit.

2. The opto-electric hybrid board according to claim 1, wherein the optical waveguide unit is fixed to a surface of the electric circuit unit via a base member.

3. A manufacturing method for an opto-electric hybrid board in which an optical waveguide unit and an electric circuit unit having an optical element mounted thereon are coupled so as to be in parallel to each other, the method comprising:
manufacturing the optical waveguide unit comprising:
forming an undercladding layer;
forming, on a surface of the undercladding layer, a core for an optical path; and
forming an overcladding layer so as to cover the core, at least one of the forming of the undercladding layer and the forming of the overcladding layer comprising extendingly providing a protruding portion for locating the electric circuit unit at a predetermined location located with respect to a light transmitting surface of the core;
manufacturing the electric circuit unit comprising:
forming an electric circuit board;
mounting the optical element at a predetermined portion on the electric circuit board, the forming of the electric circuit board comprising forming a fitting hole into which the protruding portion fits at a predetermined location located with respect to an expected mounting location of the optical element; and
after the mounting the optical element, forming, by bending, a predetermined portion which is located with respect to the optical element and which includes the optical element and the fitting hole; and
coupling the optical waveguide unit and the electric circuit unit to manufacture the opto-electric hybrid board, the coupling comprising fitting the protruding portion of the optical waveguide unit into the fitting hole of the electric circuit unit, such that the optical waveguide unit and the electric circuit unit are in an overlapping relationship, in a direction perpendicular to a longitudinal direction of the core of the optical waveguide unit.

4. The manufacturing method for an opto-electric hybrid board according to claim 3, further comprising fixing the optical waveguide unit to a surface of the electric circuit unit via a base member.

* * * * *